Figure 1:
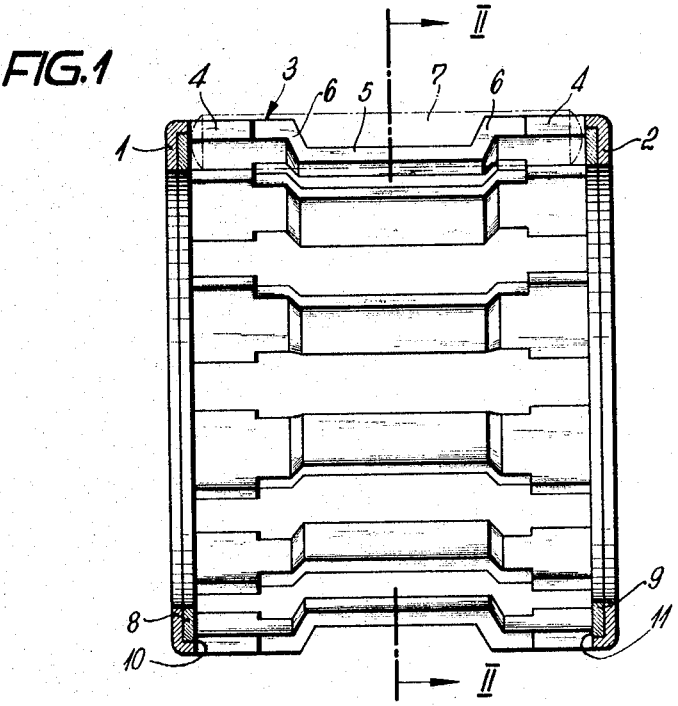

Jan. 17, 1967     G. SCHAEFFLER     3,298,761
ROLLER BEARING CAGE FOR CYLINDRICAL ROLLERS
Filed July 8, 1964

INVENTOR

GEORG SCHAEFFLER

BY Hammond & J. Hell

ATTORNEYS

United States Patent Office 3,298,761
Patented Jan. 17, 1967

3,298,761
ROLLER BEARING CAGE FOR CYLINDRICAL ROLLERS
Georg Schaeffler, Herzogenaurach, near Nurnberg, Germany, assignor to Industriewerk Schaeffler, OHG., Nurnberg, Germany, a corporation of Germany
Filed July 8, 1964, Ser. No. 381,131
Claims priority, application Germany, July 19, 1963, J 11,835
5 Claims. (Cl. 308—217)

The invention relates to a novel roller bearing cage for cylindrical rollers which cage is made of thin-walled material and which is comprised of apertures to accommodate the rollers bounded by bars whose ends are connected to one another by radially-inwardly directed flanges, the bars being bent in an offset manner so that the individual bar portions are spaced at different distances from the cage axis. In such cages, the offsetting of the bars provides guiding and retaining zones for the rollers which can be held either only in one radial direction or in both radial directions and at the same time guided parallel to the cage axis.

Difficulties occur in the production of such cages when the apertures for the rollers are being punched and the bars are being offset because the radially-inwardly directed flanges at the cage ends make it difficult to introduce the necessary counter-tools into the cage for the punching and offsetting operations. Therefore, it would be desirable to perform the punching and offset operations before forming the said inwardly-directed flanges on the cage. However, experience has shown that this is not possible since after the apertures have been punched, the cage sleeve has unequal resistance to this subsequent deformation at the various points on the periphery of the cage with the result that the cage becomes deformed to a noncircular shape at its ends.

It is an object of the invention to provide novel thin-walled cages for cylindrical rollers which is simple to manufacture.

It is another object of the invention to provide novel thin-walled, reenforced cages for cylindrical rollers.

These and other objects and advantages of the invention will become obvious from the following detailed description.

The novel roller bearing thin-walled cage for cylindrical rollers is comprised of bars which form apertures for the rollers and whose ends are connected by radially-inwardly directed flanges and which bars are bent at such angles that the individual bar portions are spaced at different distances from the cage axis and radially extending discs within the radially-inwardly directed flanges which closely abut against the said flanges.

The said cage overcomes the manufacturing problems of the known cages. The said cages are manufactured from a smooth sleeve in which first the apertures are punched and the bars are bent in an offset manner and then after the radially disposed discs have been introduced over the ends of the sleeve, the radially-inwardly directed flanges are bent over and bear close against the discs. The said discs support the cage from the inside during the deformation of the cage ends to form the said flanges and thereby the circular shape of the cage is reliably maintained. The inserted discs also have the additional desirable advantages of stiffening the cage.

To hold the discs securely in the axial direction, the cage may also have shoulders on the inner wall of the cage against which the sides of the discs remote or away from the flanges bear. This also prevents the discs from being displaced in the axial direction while the flanges are being bent over. The said discs can be made of a wear-resistant material such as steel, sintered metal or plastic which preferably has very marked or efficient sliding properties so the abutment conditions of the end faces of the rollers are improved.

Figure 2:
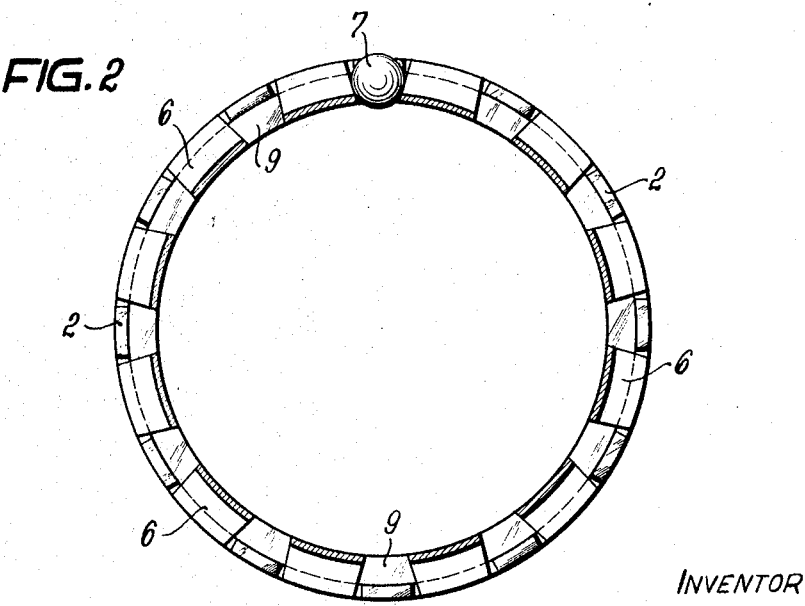

Referring now to the drawing:

FIG. 1 is a longitudinal sectional view through one embodiment of a cage constructed according to the invention; and FIG. 2 is a sectional view of the said cage on the line II—II in FIG. 1.

In the embodiment of FIG. 1, the thin-walled cage is comprised of radially-inwardly directed flanges 1 and 2 which connect the ends of cage bars 3 which extend between the said flanges. Each bar 3 consists of portions 4, 5 and 6 wherein portions 4 and 5 extend parallel to the cage axis but at different distances from the cage axis and portions 4 and 5 are connected by inclined or set back portions 6. The widths of the individual bar portions are arranged so that bar portions 4 and 5 guarantee while the bar portions 6 may act to guide the rollers although it is possible for the inclined portions 6 to be set back from the rollers so that they have no contact with the rollers and therefore the rollers must be guided by bar portions 4 or 5. In FIG. 1, a roller 7 is shown in dot-dash lines. Within flanges 1 and 2 are radially-disposed discs 8 and 9 which abut closely against flanges 1 and 2 respectively and also bear on stepped portions 10 and 11, respectively, on the cage sleeve.

FIG. 2 illustrates in detail how the widths of the bars 3 vary so that the rollers 7 are retained in both radial directions.

Various modifications of the cage of the invention may be made without departing from the spirit or scope thereof and it is to be understood that the invention is to be limited only as defined in the appended claims.

I claim:

1. A thin-walled cage for cylindrical rollers in roller bearings comprised of bars which form apertures for the rollers and whose ends are connected by radially-inwardly directed flanges and which bars are bent at such angles that the individual bar portions are spaced at different distances from the cage axis and radially-extending discs within the radially-inwardly directed flanges which closely abut against the said flanges.

2. A thin-walled cage for cylindrical rollers in roller bearings comprised of bars which form apertures for the rollers and whose ends are connected by radially-inwardly directed flanges and which bars are bent at such angles that the individual bar portions are spaced at different distances from the cage axis and radially-extending discs within the radially-inwardly directed flanges which closely abut against the said flanges, the cage having shoulders on the inner wall against which the disc sides away from the flanges abut.

3. A thin-walled cage for cylindrical rollers in roller bearings comprised of bars which form apertures for the rollers and whose ends are connected by radially-inwardly directed flanges an which bars are bent at such angles that the individual bar portions are spaced at different distances from the cage axis and radially-extending, wear-resistant discs within the radially-inwardly directed flanges which closely abut against the said flanges.

4. A thin-walled cage for cylindrical rollers in roller bearings comprised of bars which form apertures for the rollers and whose ends are connected by radially-inwardly directed flanges and which bars are bent at such angles that the individual bar portions are spaced at different distances from the cage axis and radially-extending discs with efficient sliding properties within the radially-inwardly directed flanges which closely abut against the said flanges.

5. A thin-walled cage for cylindrical rollers in roller bearings comprised of bars which form apertures for the rollers and whose ends are connected by radially-inwardly directed flanges and which bars are bent at such angles that the individual bar portions are spaced at different distances from the cage axis and radially-extending, wear-resistant discs within the radially-inwardly directed flanges which closely abut against the said flanges, the cage having shoulders on the inner wall against which the disc sides away from the flanges abut.

References Cited by the Examiner

UNITED STATES PATENTS

| 2,845,311 | 7/1958 | Cobb | 308—216 |
| 2,848,791 | 8/1958 | Neese | 308—217 |

MARTIN P. SCHWADRON, *Primary Examiner.*

FRANK SUSKO, *Examiner.*